AXLE MECHANISM

Original Filed Nov. 12, 1958 2 Sheets-Sheet 1

INVENTOR.
CHESTER D. CHRISTIE
BY Hudson, Houghton, Williams, David & Hoffmann
ATTORNEYS Oct. 23, 1962 C. D. CHRISTIE Re. 25,269

AXLE MECHANISM

Original Filed Nov. 12, 1958 2 Sheets-Sheet 2

INVENTOR.
CHESTER D. CHRISTIE
BY Hudson, Boughton, Williams, David & Hoffmann
ATTORNEYS United States Patent Office Re. 25,269
Reissued Oct. 23, 1962

25,269
AXLE MECHANISM

Chester D. Christie, Shaker Heights, Ohio, assignor to Eaton Manufacturing Company, Cleveland, Ohio, a corporation of Ohio Original No. 3,000,456, dated Sept. 19, 1961, Ser. No. 773,216, Nov. 12, 1958. Application for reissue Dec. 20, 1961, Ser. No. 161,350
8 Claims. (Cl. 180—22)

Matter enclosed in heavy brackets [ ] appears in the original patent but forms no part of this reissue specification; matter printed in italics indicates the additions made by reissue.

This invention relates to axle mechanisms for vehicles and, more particularly, to axle mechanisms of the kind comprising a plurality of drivng axles and which mechanisms are sometimes referred to as tandem axles.

An object of this invention is to provide an axle mechanism comprising a plurality of driving axles and embodying a novel construction of a very serviceable and highly practical form.

Another object is to provide such an axle mechanism comprising a pair of driving axles and a power divider or inter-axle differential, and wherein the inter-axle differential is of a novel construction and contributes materially to a smoother and more reliable functioning of the axle mechanism.

Other objects and advantages of this invention will be apparent in the following detailed description and in the accompanying drawings forming a part of this specification and in which, FIG. 1 is a partial front elevation of an axle mechanism embodying this invention and comprising multiple driving axles;

Figure 4:
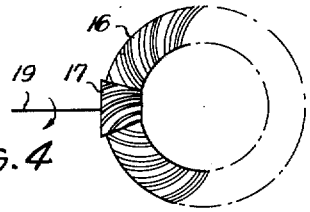
FIG. 4 is an elevational view of a diagrammatic form and representing a projection-view showing of power input gearing of the rear axle of the mechanism, when viewed as indicated by the directional line 4—4 of FIG. 3.

For purposes of disclosure of the present invention, the accompanying drawings show an axle mechanism 10 for a vehicle and which comprises a plurality of driving axles, in this instance two such axles 11 and 12 disposed in a tandem arrangement, and of which the axle 11 is the front axle and the axle 12 is the rear axle. Each of the axles is provided with a suitable housing 13 for containing the mechanism by which driving torque is supplied to the traction wheels of the vehicle.

The rear axle 12 is of a conventional construction throughout and need be described only to the extent of pointing out the general arrangement and main components thereof. The front axle 11 is illustrated in greater detail in FIG. 2 and embodies novel features and characteristics which distinguish the axle mechanism 10 over the prior art, as will be explained hereinafter.

Figure 3:
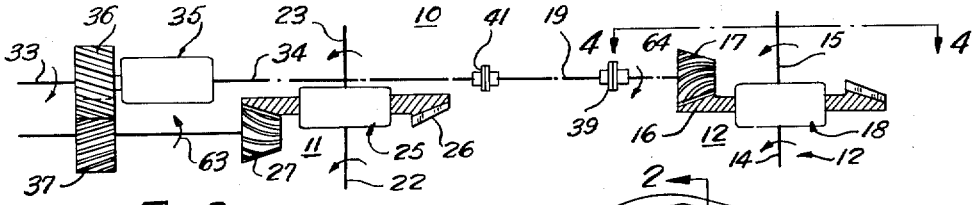
FIG. 3 is a plan view of a diagrammatic form which further illustrates the axle mechanism of FIGS. 1 and 2.
Figure 1:
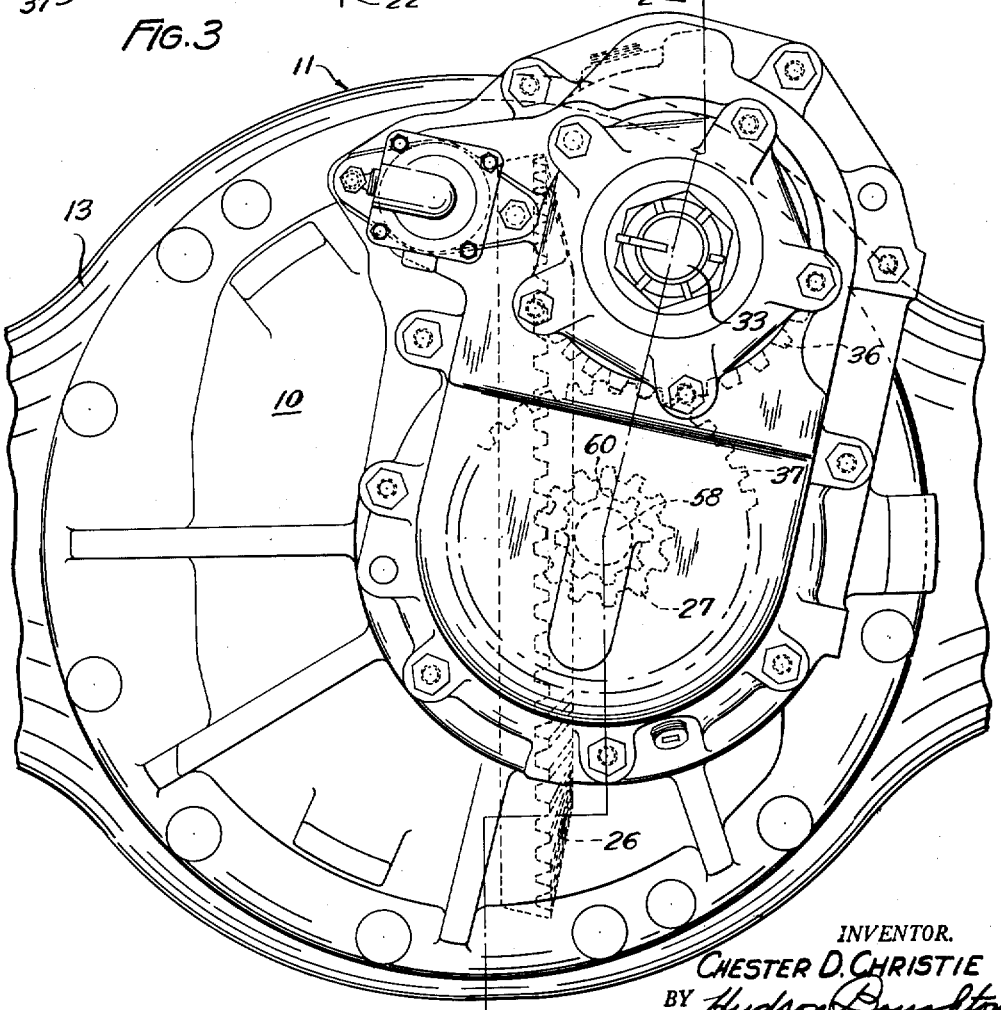

The rear axle 12 comprises, in addition to the housing thereof, a pair of transversely aligned axle shafts 14 and 15 rotatable about a common axis, as represented in FIG. 3, and by which driving torque is delivered to traction wheels associated with the rear axle. The rear axle 12 also includes power input gearing comprising a ring gear 16 and a driving pinion 17 co-operating with the latter. Additionally, the axle 12 comprises a differential 18 of a conventional construction and through which the driving torque is supplied to the axle shafts 14 and 15.

The co-operating gears 16 and 17 of the rear axle 12 are preferably bevel gears and are here shown as being of the spiral bevel type. The drive pinion 17 is connected with power input shaft means 19 which extends to the rear axle 12 from the front axle 11 and is located on the side of the ring gear 16 facing toward the axle shaft 15 as is represented in FIG. 3 of the drawing. The spiral bevel character of the gears 16 and 17 and the location of the drive pinion on the left-hand side of the ring gear, as shown in FIG. 3, are conventional in vehicle driving axles.

The front axle 11 comprises, in addition to the housing 13, a pair of axle shafts 22 and 23 located in a transversely aligned relation and rotatable about a common rotation axis 24. The front axle 11 also includes a differential 25 of a conventional construction and by which the driving torque is delivered to the axle shafts 22 and 23 for propelling the traction wheels associated with the latter. Additionally, the front axle 11 comprises a ring gear 26 and a drive pinion 27 in meshed engagement with the latter. The tooth characteristics of the ring and pinion gears 26 and 27, and the location of the pinion relative to the ring gear, are important features of the present invention and will be described hereinafter.

The differential 25 comprises side gears 28 fixed on the axle shafts 22 and 23 and planet pinions 29 mounted on a carrier or spider 30 and having meshed engagement with the side gears. The side gears 28 and the planet pinions 29 are of the bevel type, as is conventional in differential mechanisms. The ring gear 26 is secured to the carrier 30 as by suitable bolts or rivets 31.

The front axle 11 also includes power input shaft means comprising a pair of aligned shaft members 33 and 34 rotatable about a common rotation axis, and power input gearing comprising an inter-axle differential or power divider 35 and a gear train consisting of a pair of gears 36 and 37 for transmitting the input torque from the inter-axle differential to the drive pinion 27.

The shaft member 33 is provided with suitable joint or universal coupling means 40 for connection with a propeller shaft or the like and delivers input torque into the inter-axle differential 35, and the shaft member 34 delivers torque from the inter-axle differential to the power input shaft 19 of the rear axle 12. The rear end of the shaft member 34 is connected with the input shaft means 19 of the rear axle as by means of a suitable coupling or universal joint means 41. The input shaft means 19 will usually include a second coupling or universal joint means 39, as shown in FIG. 3.

The shaft member 33 is rotatably supported in the housing 13 (see FIG. 2) by suitable antifriction bearings 42 and 43, and the rear end of this shaft member extends into, and is rotatable in, a bushing 44 mounted in a socket portion provided in the front end of the shaft member 34. The bearing 43 also supports the front end of the shaft member 34 as well as the rear end of the inter-axle differential 35. The rear end of the shaft member 34 is supported in the housing 13 by a suitable antifriction bearing 45. The front end of the shaft member 33 is provided with a splined portion 47 on which the coupling 40 is mounted and is also provided with other splined portions 48 and 49 for purposes which will be described hereinafter.

The inter-axle differential 35 comprises a pair of side gears 51 and 52 located in a spaced-apart relation along the rotation axis of the shaft member 33, a rotatable carrier or spider 53, and a group of planet pinion gears 54 disposed in meshed engagement with the side gears and supported by the carrier. The side gears 51 and 52 constitute the power output members of the inter-axle differential 35 and supply power respectively to the drive pinions 27 and 17 of the front and rear axles 11 and 12. The forward side gear 51 is rotatably supported on the shaft member 33 by suitable bushings 55 and is directly connected with the gear 36 of the power input gear train of the front axle, in this instance by being formed integral with the latter gear. The aftermost side gear 52 includes a sleeve portion 52[a] which is mounted in the inner race of the bearing 43 and is drivingly connected with the shaft member 34 by a spline connection 56.

The drive pinion 27 is formed on or connected with a pinion shaft 58 which is rotatably mounted in suitable antifriction bearings 59. The forward end of the pinion shaft 58 is provided with a splined portion 60 and has the gear member 37 secured thereon.

In accordance with one of the features of the present invention, the delivery of power into the inter-axle differential 35 is accomplished in a more satisfactory manner by having the pinion carrier 53 in a floating relation on the splined intermediate portion 48 of the shaft member 33. For this purpose, the inner portion of the carrier is provided with splines 61 which are in a meshed and axially slidable engagement with the splined portion 48 of the shaft member 33. The spline elements 61 of the carrier 53 can be formed either on the body of the carrier or preferably, as here shown, on the inner ends of stub shafts 62 which are mounted in the body of the carrier and rotatably support the planet pinions 54.

Figure 2:
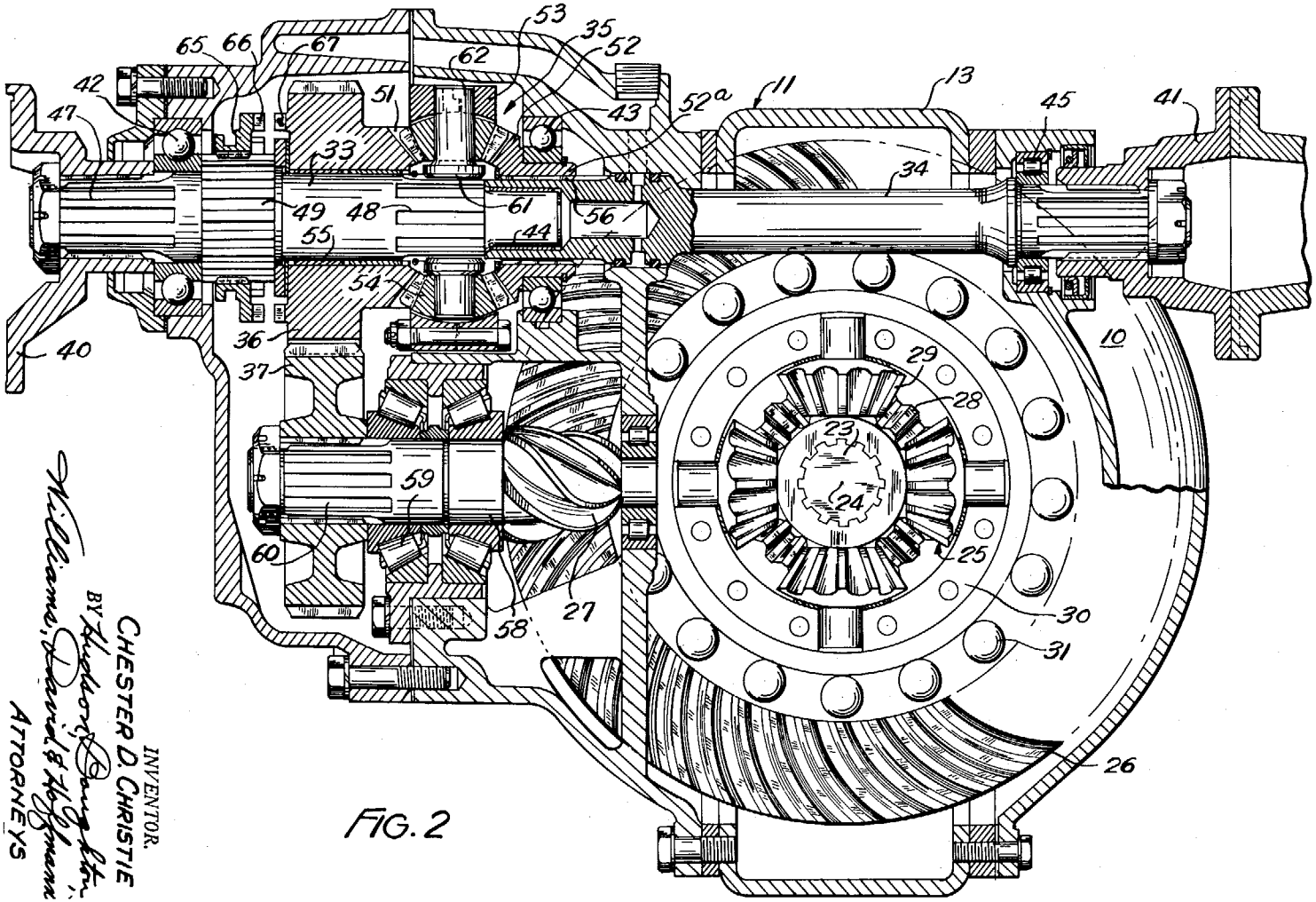
FIG. 2 is a longitudinal vertical section taken through one axle of the mechanism, the view being taken substantially as indicated by section line 2—2 of FIG. 1.

As shown in FIG. 2, the planet pinions 54 are disposed in the annular space between the toothed bevel faces of the side gears 51 and 52 and extend in a bridging or spanning relation between these gears. By having the carrier 53 in a slidable floating relation on the splined portion 48 of the power input shaft member 33, it will be seen that the planet pinions 54 will be self-adjusting or self-centering with respect to the meshed engagement of their teeth with the teeth of the side gears 51 and 52. This will permit the pinion gears to assume an axially centered position along the shaft member 33 and between the side gears 51 and 52 so that the input torque will be more evenly divided between the two side gears, and the tooth loads and wear areas will likewise be more evenly distributed for the teeth of the pinion gears and the side gears.

The drive pinion 27 of the front axle 11 is located on the right-hand side of the ring gear 26, as shown in FIGS. 2 and 3, and this represents a different arrangement than the drive pinion and ring gear arrangement referred to above as being present in the rear axle 12. When the drive pinion 27 is located on the right-hand side of the ring gear 26, the direction of driving rotation of the pinion will be a counterclockwise direction, as represented by the arrow 63 of FIG. 3, which is in contrast to the clockwise driving rotation of the drive pinion 17 of the rear axle 12 as represented by the arrow 64.

When the drive pinion 27 is located on the right-hand side of its associated ring gear 26 and has such a counterclockwise direction of driving rotation, it will be seen that the driving torque being supplied to the pinion shaft 58 can be delivered to the latter by a gear train which consists of only the two gears 36 and 37. The latter gears are here shown by way of example, as being of the spiral toothed type. When only two gears, namely the gears 36 and 37, are used in the power input train to the drive pinion 27, it will be seen that there is no need for an idler gear in such train as has been required heretofore, and the number of parts and the cost of the driving axle 11 will accordingly be reduced.

The co-operating teeth of the ring gear 26 and its associated drive pinion 27 are here shown as being of the spiral bevel type and, by comparison of these gears as shown in the drawings with the corresponding gears of the rear axle 12, it will be observed that the direction of cut of the teeth of the gears 26 and 27 is reversed from the cut of the corresponding gears of the rear axle. The reverse cut of the teeth of the gears 26 and 27 permits the drive pinion 27 to have the counterclockwise rotation and the location on the right-hand side of the ring gear, as described above, and still produce the desired forward rotation of the axle shafts 22 and 23.

In the front axle 11, as shown in FIG. 2 of the accompanying drawings, a clutch member 65 is slidably mounted on the spline portion 49 of the shaft member 33 and is rotatably driven by the latter. The clutch member 65 is provided with clutch teeth 66 for co-operation with clutch teeth 67 provided on the gear 36. The clutch member 65 provides a locking means by which the inter-axle differential 35 can be locked up when that is desirable. The clutch member 65, the spline portion 49 and the groups of clutch teeth 66 and 67 could be omitted.

From the accompanying drawings and the foregoing detailed description, it will now be recognized that this invention provides a new and improved construction for vehicle axle mechanisms of the multiple drive axle type. It will also be recognized that this new and improved axle mechanism has the advantages already described hereinabove and also represents a simple and practical form of construction which will render smooth and satisfactory service for a prolonged period of time.

Although the novel axle mechanism of this invention has been illustrated and described herein to a somewhat detailed extent it will be understood, of course, that the invention is not to be regarded as being limited correspondingly in scope but includes all variations and modifications coming within the terms of the claims hereof.

Having described my invention, I claim:

1. In a multiple driving axle assembly; a pair of first and second driving axles comprising first and second housings containing first and second power output differential gear units; first and second power input gears in said first and second housings in meshed driving engagement with said first and second differential gear units; said first housing having main and auxiliary gear chamber portions therein; anti-friction bearing means in said first housing in a spaced-apart relation along a common rotation axis including first and second antifriction bearings on opposite sides of said auxiliary gear chamber portion; drive shaft means extending to said axles for supplying torque to said power input gears including a pair of relatively rotatable first and second shaft members supported in a substantially aligned relation in said first housing by said bearing means for rotation on said common axis; an inter-axle differential in the auxiliary gear chamber portion of said first housing and comprising first and second side gears in a spaced-apart opposed relation along said common axis, and an annular group of planet pinion gears disposed between and in meshed engagement with said side gears; a gear train in said first housing for transmitting torque from said inter-axle differential to said first power input gear including a gear directly connected to and rotatable with said first side gear; said second side gear having a sleeve portion and being supported for rotation by having said sleeve portion received in said second antifriction bearing; said second shaft member having a socket portion received in and supported by said sleeve portion and connected with the latter to be driven thereby; said first shaft member extending across said auxiliary chamber portion and having one end thereof supported by said first antifriction bearing and its other end received and supported in said socket portion; said first shaft member having a splined intermediate portion and a journal portion rotatably supporting said first side gear; a carrier ring surrounding said group of planet pinion gears; and stub shaft members connected with said carrier ring so as to extend inwardly therefrom and rotatably supporting said planet pinion gears; said stub shaft members having splined inner end portions engaged with said splined intermediate portion of said first shaft member as a drive connection for said carrier ring and to provide for self-positioning of said planet pinion gears between said side gears.

2. A multiple driving axle assembly as defined in claim 1 and comprising clutch components co-operably effective between said first shaft member and said directly connected gear for producing lock-up of said inter-axle differential.

*3. In a multiple driving axle assembly; a pair of first and second driving axles comprising first and second power output differential gear units; first and second power input gears in meshed driving engagement with said first and second differential gear units; said first axle having a housing containing main and auxiliary gear chamber portions; antifriction bearing means in said housing in a spaced-apart relation along a common rotation axis including first and second antifriction bearings on opposite sides of said auxiliary gear chamber portion; drive shaft means extending to said axles for supplying torque to said power input gears including a pair of relatively rotatable first and second shaft members in said housing in a substantially aligned relation along said common axis; an inter-axle differential in the auxiliary gear chamber portion of said housing and comprising first and second side gears in a spaced-apart opposed relation along said common axis, and an annular group of planet pinion gears disposed between and in meshed engagement with said side gears; rotatable carrier means surrounding said axis and carrying said planet pinion gears; and a gear train in said housing for transmitting torque from said inter-axle differential to said first power input gear including a gear directly connected to and rotatable with said first side gear; said second side gear having sleeve means thereon and being supported for rotation by having said sleeve means received in said second antifriction bearing; said first shaft member extending across said auxiliary chamber portion and having one end thereof supported by said first antifriction bearing and said first shaft member also having a splined intermediate portion in driving engagement with said carrier means, and a journal portion rotatably supporting said first side gear; the other end of said first shaft member and one end of said second shaft member comprising first and second adjacent shaft end portions rotatably supported by said second antifriction bearing, and said second adjacent shaft end portion being connected with said sleeve means by a drive connection therebetween.*

*4. A multiple driving axle assembly as defined in claim 3 wherein said first and second adjacent shaft end portions extend into said sleeve means from opposite ends thereof.*

*5. A multiple driving axle assembly as defined in claim 3 wherein said first and second adjacent shaft end portions extend into said sleeve means from opposite ends thereof; said drive connection comprising co-operating spline elements on said sleeve means and said second adjacent shaft end portion.*

*6. In a multiple driving axle assembly; a pair of first and second driving axles comprising first and second power output differential gear units; first and second power input gears in meshed driving engagement with said first and second differential gear units; said first axle having a housing containing main and auxiliary gear chamber portions; antifriction bearing means in said housing on a common rotation axis including first and second antifriction bearings on opposite sides of said auxiliary gear chamber portion; drive shaft means extending to said axles for supplying torque to said power input gears including a pair of relatively rotatable first and second shaft members in said housing in a substantially aligned relation along said common axis; an inter-axle differential in the auxiliary gear chamber portion of said housing and comprising first and second side gears in a spaced-apart opposed relation along said common axis, and an annular group of planet pinion gears disposed between and in meshed engagement with said side gears; a gear train in said housing for transmitting torque from said inter-axle differential to said first power input gear including a gear directly connected to and rotatable with said first side gear; said second side gear having sleeve means thereon and being supported for rotation by having said sleeve means received in said second antifriction bearing; said first shaft member extending across said auxiliary chamber portion and having a splined portion, and a journal portion rotatably supporting said first side gear; a drive connection between said sleeve means and said second shaft member; carrier means for said group of planet pinion gears; and stub shaft members mounted on said carrier means so as to extend inwardly therefrom and rotatably supporting said planet pinion gears; said stub shaft members having splined inner end portions engaged with said splined portion of said first shaft member as a drive connection for said carrier means and to provide for self-positioning of said planet pinion gears between said side gears.*

*7. A multiple drive axle assembly as defined in claim 6 wherein said second shaft member extends into said sleeve means; and spline means providing said drive connection between said sleeve means and second shaft member.*

*8. In a multiple driving axle assembly; a pair of first and second driving axles comprising first and second power output differential gear units; first and second power input gears in meshed driving engagement with said first and second differential gear units; said first axle having a housing containing main nad auxiliary gear chamber portions; antifriction bearing means in said housing in a spaced-apart relation along a common rotation axis including first and second antifriction bearings on opposite sides of said auxiliary gear chamber portion; drive shaft means extending to said axles for supplying torque to said power input gears including a pair of relatively rotatable first and second shaft members in said housing in a substantially aligned relation along said common axis; an inter-axle differential in the auxiliary gear chamber portion of said housing and comprising first and second side gears in a spaced-apart opposed relation along said common axis, and an annular group of planet pinion gears disposed between and in meshed engagement with said side gears; a gear train in said housing for transmitting torque from said inter-axle differential to said first power input gear including a gear directly connected to and rotatable with said first side gear; said second side gear having sleeve means thereon and being supported for rotation by having said sleeve means received in said second antifriction bearing; said first shaft member extending across said auxiliary chamber portion and having one end thereof supported by said first antifriction bearing and said first shaft member also having a splined intermediate portion, and a journal portion rotatably supporting said first side gear; the other end of said first shaft member and one end of said second shaft member comprising first and second adjacent shaft end portions rotatably supported by said second antifriction bearing, and said second adjacent shaft end portion being connected with said sleeve means to be driven thereby; a carrier ring surrounding said group of planet pinion gears; and stub shaft members connected with said carrier ring so as to extend inwardly therefrom and rotatably supporting said planet pinion gears; said stub shaft members having splined inner end portions engaged with said splined intermediate portion of said first shaft member as a drive connection for said carrier ring and to provide for self-positioning of said planet pinion gears between said side gears.*

References Cited in the file of this patent or the original patent

UNITED STATES PATENTS

| | | |
|---|---|---|
| 1,711,128 | Robbins | Apr. 30, 1929 |
| 1,892,573 | Harvey | Dec. 27, 1932 |
| 1,988,183 | Whitcomb | Jan. 15, 1935 |
| 2,158,320 | Bock | May 16, 1939 |

(Other references on following page)

UNITED STATES PATENTS

| | | |
|---|---|---|
| 2,262,710 | Lang | Nov. 11, 1941 |
| 2,355,144 | Carlson | Aug. 8, 1944 |
| 2,383,873 | MacPherson | Aug. 28, 1945 |
| 2,395,108 | Donley et al. | Feb. 19, 1946 |
| 2,490,146 | Miller | Dec. 6, 1949 |
| 2,548,258 | Griffith | Apr. 10, 1951 |

| | | |
|---|---|---|
| 2,574,986 | Schou | Nov. 13, 1951 |
| 2,771,791 | Bachman | Nov. 27, 1956 |
| 2,796,941 | Hill | June 25, 1957 |
| 2,805,743 | Keese | Sept. 10, 1957 |

FOREIGN PATENTS

| | | |
|---|---|---|
| 1,018,742 | Germany | Oct. 31, 1957 |
| 312,147 | Great Britain | Apr. 24, 1930 |